United States Patent [19]

Rebikoff

[11] 4,175,269
[45] Nov. 20, 1979

[54] UNDERWATER TV SURVEILLANCE OF PIPELINES

[76] Inventor: Dimetri Rebikoff, 102 R.D. E. Gazagnaire 06400, Cannes, France

[21] Appl. No.: 470,226

[22] Filed: May 15, 1974

[51] Int. Cl.² .............................................. H04N 7/18
[52] U.S. Cl. ...................................................... 358/99
[58] Field of Search ...................... 178/DIG. 1, 6.8, 6, 178/DIG. 20, DIG. 38, 7.2; 352/242, 243; 294/66 A; 354/64; 358/99

[56] References Cited

U.S. PATENT DOCUMENTS

| 2,334,475 | 11/1943 | Claudet | 178/DIG. 1 |
| 2,355,086 | 8/1944 | Lang | 178/DIG. 1 |
| 2,849,530 | 8/1958 | Fleet | 178/DIG. 1 |
| 3,184,541 | 5/1965 | Foster et al. | 178/6 |
| 3,527,881 | 9/1970 | Blanchard | 178/6 |
| 3,674,925 | 7/1972 | Heckman, Jr. | 178/DIG. 38 |
| 3,688,666 | 9/1972 | Tuttle et al. | 354/64 |
| 3,765,184 | 10/1973 | Menard | 294/66 |
| 3,780,220 | 12/1973 | Fugitt et al. | 178/DIG. 1 |

FOREIGN PATENT DOCUMENTS

1053810 of 1959 Fed. Rep. of Germany ............. 354/64
1125978 of 1956 France ...................................... 354/64

OTHER PUBLICATIONS

Schulke, "Some Technical Aspects of Underwater Cinematography", *Journal of the SMPTE*, Dec. 1973, vol. 82, pp. 983–991.

*Primary Examiner*—John C. Martin
*Attorney, Agent, or Firm*—Malin & Haley

[57] ABSTRACT

A method for making underwater photographic surveys of pipelines and cables utilizing a stereo television camera with unique underwater corrected lenses in combination with one or several wet reflector floodlamps mounted on a submarine vehicle which is controlled remotely at the water's surface. The floodlamp placement in combination with the corrected lenses enables the making of underwater surveys even in water clouded with suspended colloidal solids.

5 Claims, 1 Drawing Figure

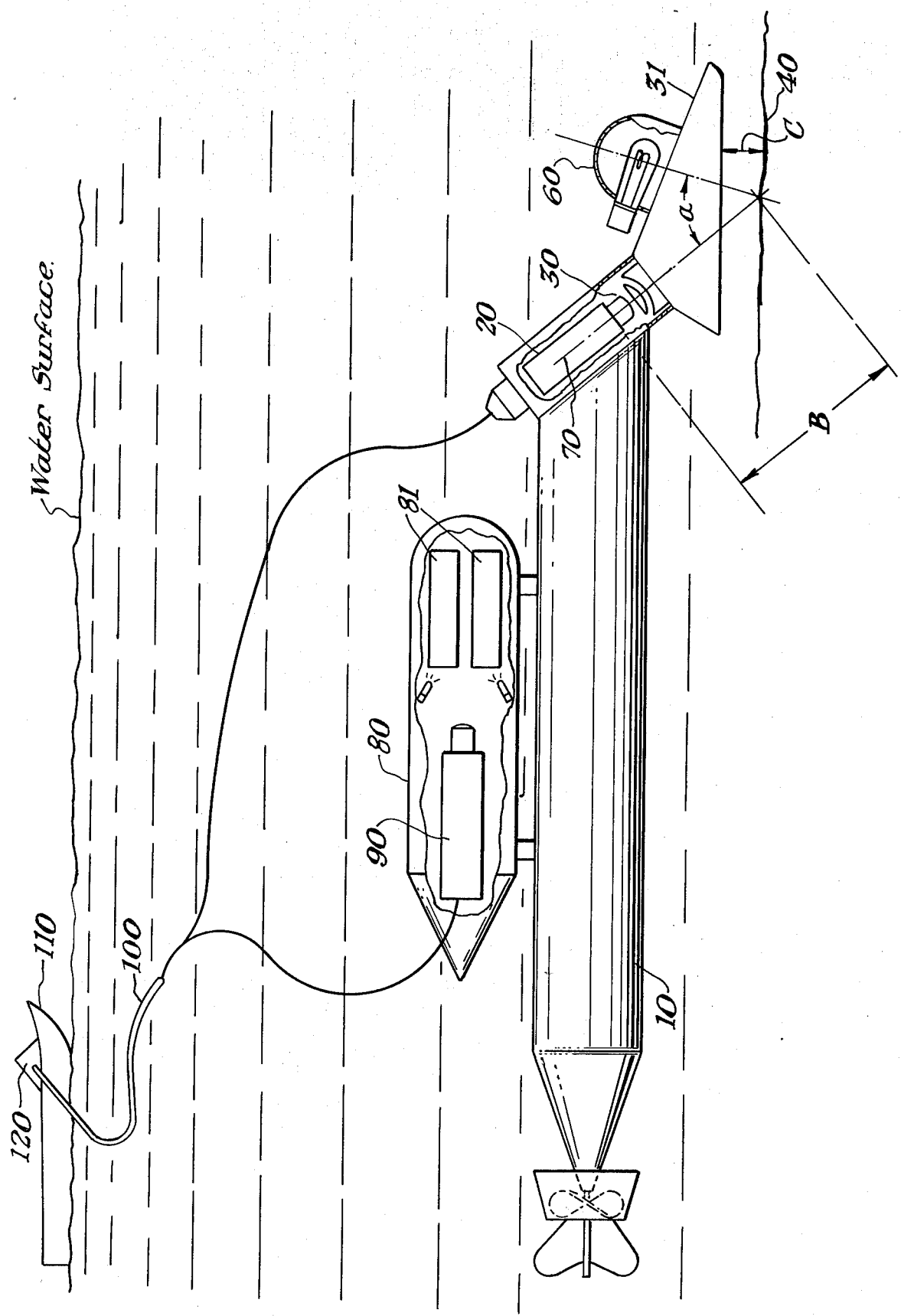

UNDERWATER TV SURVEILLANCE OF PIPELINES

BACKGROUND OF THE INVENTION

Safety requires frequent inspection of the full length of undersea pipelines and cables. The best method for such inspection is a visual survey using underwater cameras and floodlights. Present means for carrying out such a visual survey include employing a succession of relatively short, overlapping walks by divers or using a small, manned submarine vehicle. Disadvantages of these means for visual surveys are the divers' limitation to short times at relatively shallow depths thus inflating the overall expense of such surveys, and causing a high risk of human and equipment losses at sea.

The present process obviates the need for such manned underwater excursions.

SUMMARY OF THE INVENTION

A method of making underwater photographic surveys of pipelines and cables especially in turbid water, utilizing a remote-controlled underwater platform in the form of a preferably streamlined small submarine vehicle. This electrically powered vehicle is equipped with attitude, direction and depth instruments together with a television camera which allows these instruments to be viewed on a remote television monitor above the water's surface. Attached to this submarine vehicle are television and photographic film cameras as required for the specific survey. Both the control television camera and the optional survey cameras are equipped with wide angle lenses incorporating the reverse Galileo telescope underwater correcting lens system (Ivanoff, U.S. Pat. No. 2,730,014). This correcting lens system is used together with underwater floodlamps which are attached to the submarine vehicle in a way that optimizes subject lighting while minimizing cloudiness caused by light reflection from suspended solids.

The general object of this invention is to provide a reliable underwater visual survey system which will be usable even in turbid water.

A specific object of this invention is to provide an underwater survey system usable without recourse to human divers. The physical limitations of divers using ordinary underwater breathing apparatus or small manned submarines renders such surveying feasible only at relatively shallow ocean depths for short time periods.

In accordance with these and other objects which will be apparent hereinafter, the instant invention will now be described with particular reference to the accompanying drawings.

BRIEF DESCRIPTION OF THE DRAWING

The FIGURE is a side elevation of the apparatus.

DESCRIPTION OF THE PREFERRED EMBODIMENT

Referring to the drawings in detail, wherein like numerals indicate like elements, there is shown in the FIGURE a submarine vehicle 10 upon which underwater platform is mounted a television camera or cameras 20 (and/or a moving picture camera or cameras) in such a way as to face forward and upward or downward in the direction of the submarine's 10 movement. The viewing system includes the camera 20 which is mounted upon the submarine 10 such that the normal distance B from camera 20 focus plane 30 to the subject is made as short as possible with the lens approximately no farther than its own aperture and with a solid block of clear plastic 31 protruding into the lens mount to contact the front lens,—and in sliding contact with the bottom in the forward direction. Also included in the system and mounted upon said clear plastic block 31 are one or several deep-dish wet reflector lamps 60 having a bulb 61 and a shield 62. The shield 62 is connected to the block 31. This lamp 60 is located upon block 31 so as to be as close as possible and as far forward toward the subject plane 40 as possible without actually intruding into the frame of the image formed in camera 20. An additional restraint upon the placement of these lamps 60 is that these lamps 60 are located at an optimum angle "a" of 45 degrees (subject to a maximum of 90 degrees and a minimum of 30 degrees) between the center line axis 70 of the camera lens 30 and axis 71 in reference to the subject 40. By reason of this placement of the camera 20 and lamps 60 the light from the lamps 60 travels a minimum distance C through cloudy water before striking the subject plane 40. This allows light of maximum intensity to strike the subject plane 40. From the subject 40, the light travels toward the camera lens 30. Since the light source 60 is placed in the position relative to the subject 40 as described above, the subject plane 40 reflects the light and is seen to be the major source of light for the image produces in the camera 20. Also, it will be seen that the suspended solids which might be present in the water are backlighted by the light reflected from the subject plane 40. This effectively helps eliminate snow-type interference from the resultant image.

Also mounted upon the submarine vehicle 10 is a buoyant instrument package 80 which contains instruments 81 capable of representing the attitude of the submarine 10 with respect to an artificial horizon, the heading of the submarine 10 with respect to True North, the distance which the submarine 10 has travelled under its own power, and the depth at which the submarine 10 is travelling. This instrument package 80 is remotely in view above the water's surface through the use of a camera 90 which is mounted upon the submarine 10. The images from this camera 90, the image cameras 30, together with the control signals necessary for the operation of the submarine vehicle 10 are conducted through an umbilical 100 with a surface dinghy 110 upon which a remote moniter 120 or a two-way radio relay is located.

The submarine 10 together with its cameras 30 is controlled on all 3 axis including roll to conteract umbilical twist and make very tight turns from a point above the water's surface.

The instant invention has been shown and described herein in what is considered to be the most practical and preferred embodiment. It is recognized, however, that departures may be made there from within the scope of the invention and that obvious modifications will occur to a person skilled in the art.

What I claim is:

1. In a remote-controlled submarine viewing system used to make and transfer photographic images in turbid water, comprising:

a solid block of clear plastic having a forward viewing surface and sides, said viewing surface shaped to be placed close to the surface of the subject matter being viewed, a deep-dish underwater flood lamp connected to said block above said forward viewing surface such that the light from said lamp passes through said block and then strikes the subject matter being viewed after passing through a reduced amount of turbid water, a camera, mounted adjacent another surface of said plastic block to receive the light from said underwater flood lamp after being reflected from the subject matter after it passed through said forward viewing surface, an underwater corrected lense means mounted between said block and said camera, said camera, said flood lamp and said viewing surface positioned relative to one another to diminish the reflecting light surface of any particles suspended in the turbid water lying in said reduced amount of turbid water between said viewing surface and the subject matter being viewed, whereby the light from said flood lamps which strokes the subject being viewed is reflected from the subject back through said viewing surface, said plastic block and said corrected lenses to said camera, said camera, said corrected lenses, said plastic block and said flood light mountable upon a submarine vehicle, said submarine vehicle including an electrical power source positioned above the water's surface, said submarine vehicle including a propelling means, a bouyant instrument package affixed to the surface of said submarine for maintaining said submarine in a stable, and upright position, said instrument package containing attitude, direction and distance-measuring instruments together with a second camera and second light source for providing attitude, direction and distance-measuring information to a remote point, an umbilical cable means connected between said power source and said instrument package, propelling means, said flood lamp, and said camera such that said submarine may be controlled from above the water's surface by reference to the information from said instruments transmitted to the surface by said second camera, and to the images of the subject being viewed which may be transmitted by said first camera to the water's surface.

2. An underwater device used for clearly viewing complete images in turbid water and making photographs of the complete images, comprising:

a body positionable near an underwater surface of the subject matter to be viewed, an underwater electromagnetic wave light source connected to said body to provide a directional output of said light source, from said light source through said body toward the surface of the subject matter being viewed, a camera connected to said body, said camera positioned such that the light from said light source which strikes the surface of the subject being viewed is reflected at a reflected angle from the surface of the subject through said body into said camera, said camera having a center line viewing axis, said body including a block of clear viewing material having a forward viewing surface, sides, a camera mounted surface and a light source mounted surface, said light source having a general center line light axis, said light source and said camera fixedly positioned upon said body relative to one another with said reflected angle between said viewing axis and said light axis being greater than 40 degrees and less than 60 degrees to reduce the viewable area on particles positioned between said light source and said camera.

3. A device used for viewing complete images in turbid water as set forth in claim 2 wherein, said light source is an underwater flood lamp and said reflected angle is approximately 45 degrees.

4. A device used for viewing complete images in turbid water as set forth in claim 2 wherein, said camera includes a camera lense connected to said camera and at least one underwater corrected lense having one side connected adjacent to said camera lense and a second surface facing the surface of the subject matter.

5. An underwater device used for viewing complete images in turbid water and making photographs of the complete images, comprising:

a body positionable near an underwater surface of the subject matter to be viewed, an underwater electromagnetic wave source directing the wave energy from said source toward the surface of the subject matter being viewed, a camera connected to said body, said camera positioned such that said wave energy from said wave source which strikes the surface of the subject being viewed is reflected at a reflected angle from the surface of the subject into said camera, said camera having a center line viewing axis, said wave source having a general center line wave axis, said wave source and said camera positioned relative to one another with said reflected angle between said viewing axis and said wave axis being greater than 30 degrees and less than 90 degrees to reduce the viewable area on particles positioned between said wave source and said camera, said camera includes a camera lense connected to said camera and at least one underwater corrected lense having one side connected adjacent to said camera lense and a second surface facing the surface of the subject matter, and said body includes a block of material having a forward viewing surface, sides, and another surface connected adjacent to said second surface of said corrected lense, said block of material having said camera and said wave source mounted thereupon such that the wave energy from said wave source passes through said block of material to strike the surface of the subject being viewed and is reflected from the surface of the subject through said block of material into said camera.

* * * * *